US011650914B2

(12) United States Patent
Zalivaka et al.

(10) Patent No.: US 11,650,914 B2
(45) Date of Patent: May 16, 2023

(54) SYSTEM AND METHOD FOR IDENTIFICATION OF MEMORY DEVICE BASED ON PHYSICAL UNCLONABLE FUNCTION

(71) Applicant: SK hynix Inc., Gyeonggi-do (KR)

(72) Inventors: Siarhei Zalivaka, Minsk (BY); Alexander Ivaniuk, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/394,742

(22) Filed: Aug. 5, 2021

(65) Prior Publication Data
US 2023/0045933 A1 Feb. 16, 2023

(51) Int. Cl.
*G06F 12/02* (2006.01)
*G06F 12/0882* (2016.01)
*G06F 3/06* (2006.01)

(52) U.S. Cl.
CPC ........ *G06F 12/0246* (2013.01); *G06F 3/064* (2013.01); *G06F 3/0619* (2013.01); *G06F 3/0652* (2013.01); *G06F 3/0679* (2013.01); *G06F 12/0882* (2013.01)

(58) Field of Classification Search
None
See application file for complete search history.

(56) References Cited

U.S. PATENT DOCUMENTS

| 9,159,423 | B1 | 10/2015 | Brahmadathan et al. |
| 2008/0056497 | A1* | 3/2008 | Lee .......... G06T 1/005 380/28 |
| 2016/0274969 | A1* | 9/2016 | Chen .......... H03M 13/1111 |
| 2019/0221139 | A1* | 7/2019 | Schrijen .......... H04L 9/0866 |
| 2020/0313911 | A1 | 10/2020 | Mondello et al. |
| 2022/0085817 | A1* | 3/2022 | Ji .......... G11C 7/12 |

OTHER PUBLICATIONS

Zalivaka S S, et al., Design and Implementation of High-Quality Physical Uncionable Functions for Hardware-Oriented Cryptography, Secure System Design and Trustable Computing, pp. 39-81, Springer.
Edward Suh G., et al., Physical Uncionable Functions for Device Authentication and Secret Key Generation, Jun. 2007, pp. 9-14, DAC'07: Proceedings of the 44th annual Design Automation Conference.

* cited by examiner

*Primary Examiner* — Stephanie Wu
(74) *Attorney, Agent, or Firm* — IP & T Group LLP

(57) ABSTRACT

A system which identifies a memory device using a physical unclonable function. The system performs raw read operations on every page of a block; sorts the pages into low and high groups using an average number of ones based on the raw read operations; generates unordered page pairs by sequentially selecting a first page from the low group and a second page from the high group; generates ordered page pairs by selectively converting an order of pages in each pair of the unordered page pairs; and generates a sequence for identifying the selected block based on comparing the average number of ones for pages in each ordered page pair.

21 Claims, 10 Drawing Sheets

SYSTEM AND METHOD FOR IDENTIFICATION OF MEMORY DEVICE BASED ON PHYSICAL UNCLONABLE FUNCTION

BACKGROUND

1. Field

Embodiments of the present disclosure relate to a scheme for identifying a memory device in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs).

Even when the same type of memory systems (or storage devices) are fabricated using the same fabrication process, differences inevitably occur between the physical or electrical parameters of the memory systems. Memory systems that generate theoretically unpredictable results using the unpredictable differences in a fabrication process and have the intrinsic characteristics of the corresponding systems are referred to as physical unclonable function (PUF) circuits. That is, characteristics of memory systems are identified using a physical unclonable function. In this context, embodiments of the invention arise.

SUMMARY

Aspects of the present invention include a system and a method for identifying a memory device using a physical unclonable function.

In one aspect of the present invention, a system includes an identifiable device including a controller and a memory device coupled to the controller and including a plurality of blocks. The controller is configured to: perform multiple raw read operations on every page of a block selected from among the plurality of blocks; sort the pages of the selected block into low and high groups using an average number of ones which are obtained based on the multiple raw read operations; generate multiple unordered page pairs by sequentially selecting one page from the low group as a first page of each unordered page pair and one page from the high group as a second page of each unordered page pair; generate multiple ordered page pairs by selectively converting an order of pages in each pair of the multiple unordered page pairs based on an address order between the first page of the low group and a next page of the low group following the first page; and generate a sequence for identifying the selected block based on comparing the average number of ones for a former page and a latter page in each pair of the multiple ordered page pairs.

In another aspect of the present invention, a method for operating an identifiable device including a controller and a memory device coupled to the controller and including a plurality of blocks. The method includes: performing multiple raw read operations on every page of a block selected from among the plurality of blocks; sorting the is pages of the selected block into low and high groups using an average number of ones which are obtained based on the multiple raw read operations; generating multiple unordered page pairs by sequentially selecting one page from the low group as a first page of each unordered page pair and one page from the high group as a second page of each unordered page pair; generating multiple ordered page pairs by selectively converting an order of pages in each pair of the multiple unordered page pairs based on an address order between he first page of the low group and a next page of the low group following the first page; and generating a sequence for identifying the selected block based on comparing the average number of ones for a former page and a latter page in each pair of the multiple ordered page pairs.

Additional aspects of the present invention will become apparent from the following description.

DETAILED DESCRIPTION

Figure 1:
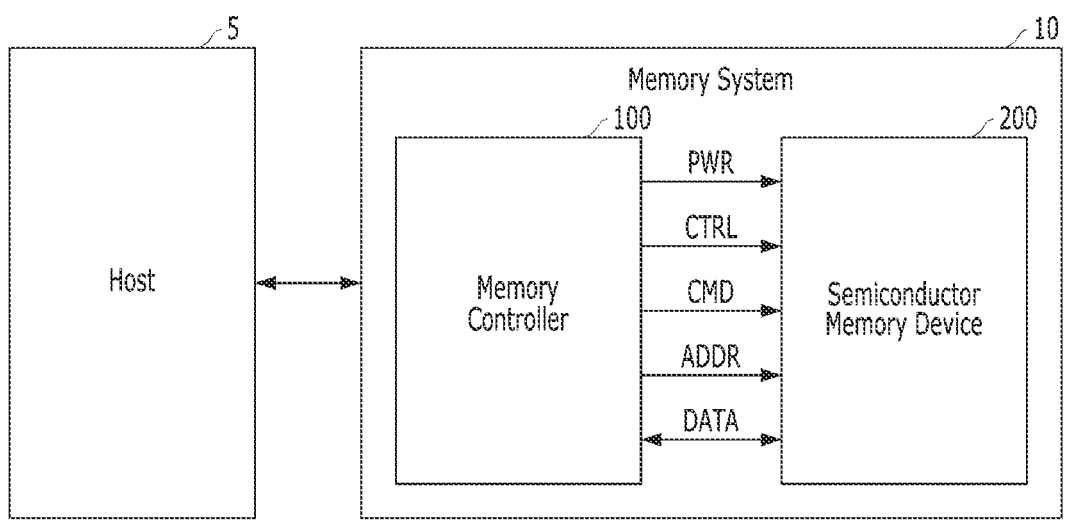
FIG. 1 is a block diagram illustrating a data processing system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor'' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a is workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operation of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
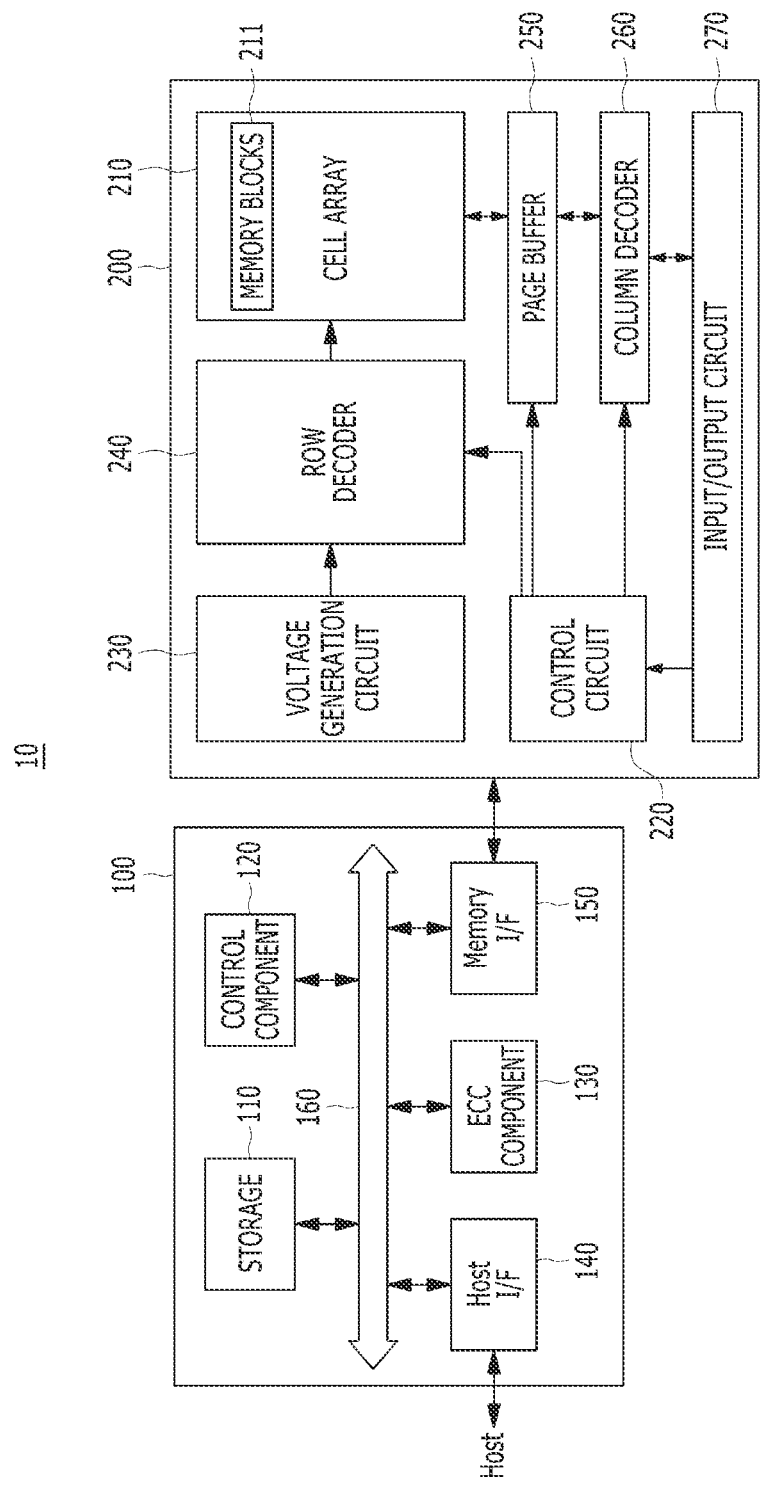
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for is the read and write operations. To store the data, the storage 110 may include a program memory, a data memory, a write buffer, a read buffer, a map buffer, and the like.

The control component 120 may control general operation of the memory system 10, and in particular a write operation and a read operation for the memory device 200 in response to a corresponding request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (DATA), an enhanced small disk interface (ESDI), and/or an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation on the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
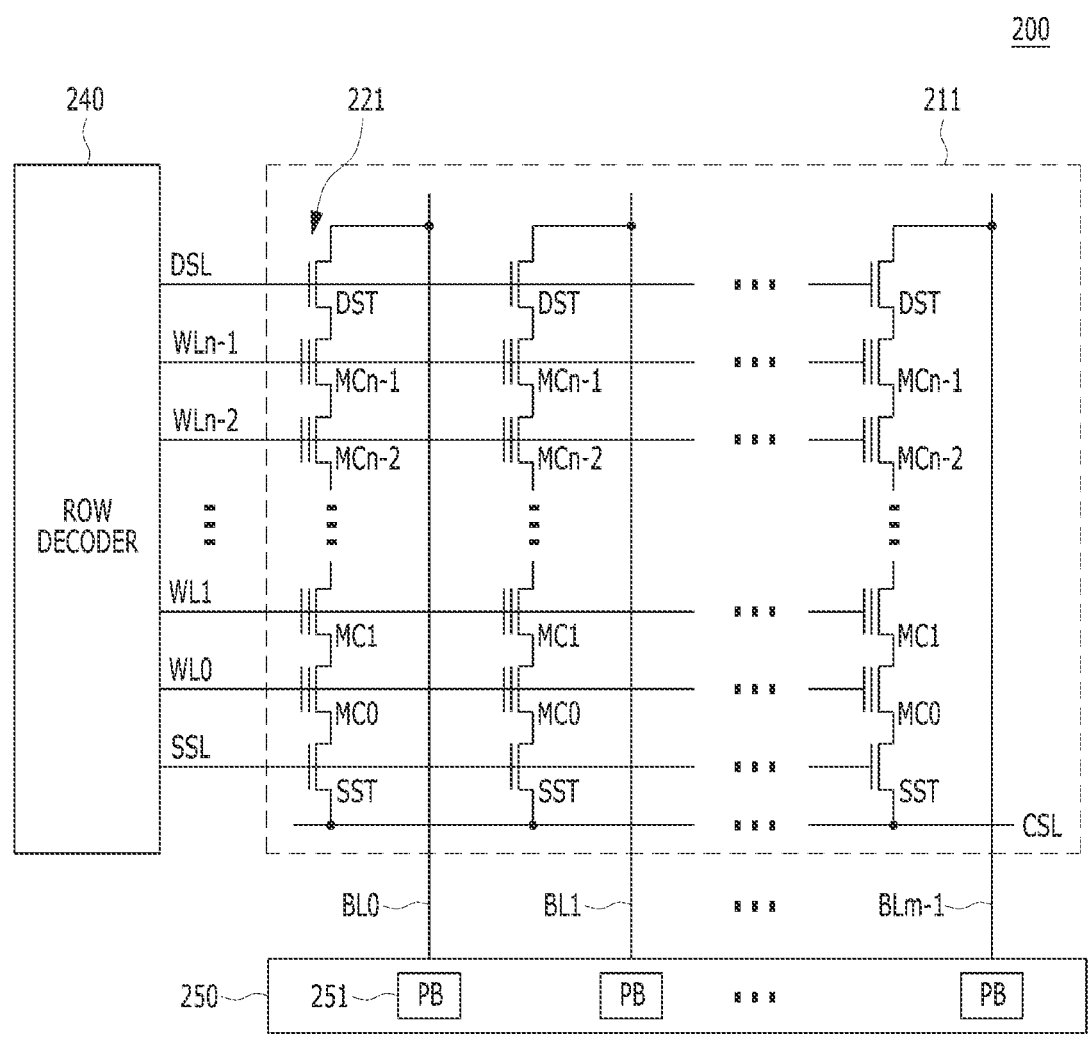
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a single level cell (SLC) storing 1 bit of data, a multi-level cell (MLC) storing 2 bits of data, a triple-level cell (TLC) storing 3 bits of data, or a quadruple-level cell (CLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to a corresponding word line WL0, the gates of memory cells MC1 are coupled to a corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include NAND-type flash memory cells. However, the memory blocks 211 are not limited to such a cell type, but may include NOR-type flash memory cells. Memory cell array 210 may be implemented as a hybrid flash memory in which two or more types of memory cells are combined, or one-NAND flash memory in which a controller embedded inside a memory chip.

Figure 4:
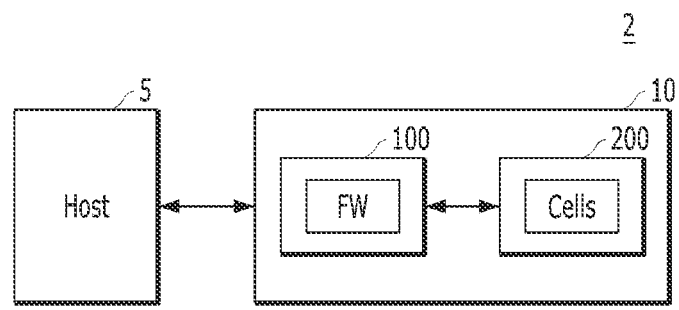
FIG. 4 is a diagram illustrating a data processing system in accordance with an embodiment of the present invention.

FIG. 4 is a diagram illustrating a data processing system 2 in accordance with an embodiment of the present invention.

Referring to FIG. 4, the data processing system 2 may include a host 5 and a memory system 10. The memory system 10 may include a controller 100 and a memory device 200. The controller is 100 may include firmware (FW) which is a specific class of software for controlling various operations (e.g., read, write, and erase operations) for the memory device 200. In some embodiments, the firmware may reside in the storage 110 and may be executed by the control component 120, in FIG. 2.

The memory device 200 may include a plurality of memory cells (e.g., NAND flash memory cells). The memory cells are arranged in an array of rows and columns as shown in FIG. 3. The cells in a particular row are connected to a word line (e.g., WL0), while the cells in a particular column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired fro the bit line. Multiple pages may share the memory cells that belong to (i.e., are coupled to) the same word line.

Intrinsic characteristics of the memory device may be identified using physical unclonable functions or physically unclonable functions (PUFs). Nowadays physical unclonable functions (PUFs) are becoming ubiquitous cryptographic primitive as an alternative to classical cryptographic algorithms in compact digital devices. PUFs utilize uncontrollable manufacturing process variations in integrated circuits (IC) in order to provide either true random numbers or unique and reliable cryptographic keys (identifiers). There are many types of PUFs, e.g., an arbiter PUF, a ring oscillator PUF, a SRAM PUF, a bistable ring PUF, etc., which are based on different physical characteristics of ICs (e.g., delay differences, frequencies, threshold voltages, initial memory states, etc.).

Memory cells of a memory device such as a NAND flash device have quite a low reliability in a data path, which leads to using error correction codes (ECCs) with high correcting capability, e.g., BCH or LDPC code, in the data path. On the other hand, excluding error correction codes from the data path creates a possibility of generating unique and unpredictable bits from the memory cells. Accordingly, embodiments provide a scheme for generating unique and unpredictable identifiers (cryptographic keys) for identifying a memory device (e.g., NAND flash memory device) based on physical unclonable functions.

Figure 5:
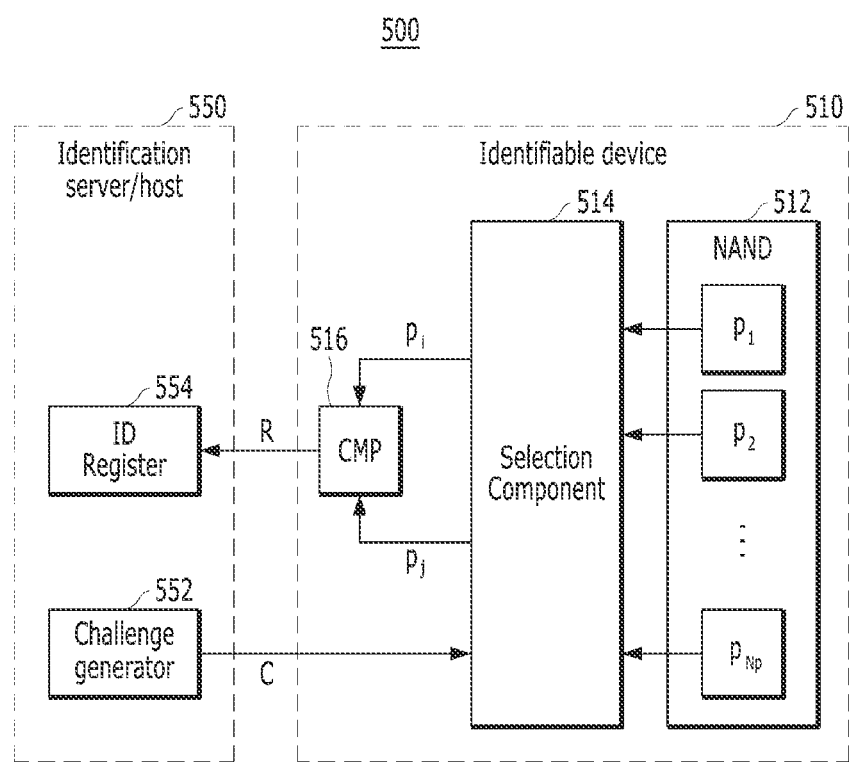
FIG. 5 is a diagram illustrating a system for generating a sequence for identifying a memory device in accordance with an embodiment of the present invention.

FIG. 5 is a diagram illustrating a system 500 for generating a sequence for identifying a memory device in accordance with an embodiment of the present invention.

Referring to FIG. 5, the system 500 may generate unique and unpredictable keys or identifiers using a physical unclonable function (PUF). PUFs are usually implemented in integrated circuits and are typically used in applications with high security requirements, more specifically cryptography. PUFs may be used based on unique physical variations which occur naturally during semiconductor manufacturing.

The system 500 may be used for a memory system (storage device). The system 500 may provide a physically defined "digital fingerprint" response (output) that serves as a unique identifier for a given input and conditions (challenge). The system 500 may include an identifiable device 510 and an identification server 550. In some embodiments, the identifiable device 510 and the identification server 550 correspond to the memory system 10 and the host device 5 in FIGS. 1-4, respectively.

The identification server 550 may generate a challenge value C and transfer the challenge value C to the identifiable device 510. The identifiable device 510 may generate a response R as a sequence of identifiers based on the challenge value C. The identification server 550 may include a challenge generator 552 and an identification (ID) register 554. The challenge generator 552 may generate the challenge value C. The ID register 554 may receive and store the response R.

The identifiable device 510 may include a memory device 512, a selection (or sampling) component 514 and a comparison component 516. The memory device 512 may correspond to the memory device 200 of FIGS. 1-5. The selection component 514 and the comparison component 516 may correspond to the controller 100 of FIGS. 1-5. The identifiable device 510 may generate a sequence as identifiers (IDs) or keys for identifying the memory device 512, i.e., the response R as unique and unpredictable bits from the memory device 512, e.g., NAND memory cells.

Figure 6:
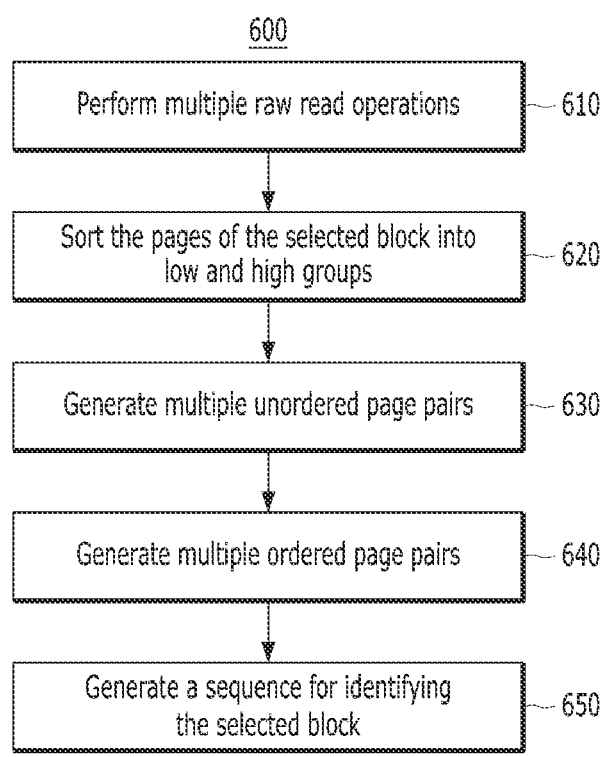
FIG. 6 is a flowchart illustrating a method for generating a sequence for identifying a memory device in accordance with an embodiment of the present invention.

FIG. 6 is a flowchart illustrating a method 600 for generating a sequence for identifying a memory device in accordance with an embodiment of the present invention. The method 600 may be performed by the memory device 512 and a controller (i.e., the selection component 514 and the comparison component 516).

Referring to FIG. 6, the method 600 may include operations 610 to 650. Before performing the method 600, the memory device 512 may erase a block selected from among the plurality of blocks, and may write a set pattern to all pages of the selected block. In some embodiments, the set pattern may include an all-zero pattern.

In operation 610, the memory device 512 may perform multiple raw read operations on every page of a block selected from among the plurality of blocks. In some embodiments, each of the multiple raw read operations may include: reading each page of the selected block multiple times without a process using an error correction code (ECC) on the read page; and determining the average number of ones of each read page.

In operation 620, the selection component 514 may sort the pages of the selected block into low and high groups using an average number of ones, which are obtained based on the multiple raw read operations. In some embodiments, the pages of the selected block may be aligned in ascending order based on the average number of ones. In some embodiments, the low group may include a set number of pages from a page having a lowest average number of ones, and the high group may include the set number of pages from a page having a highest average number of ones. In some embodiments, a total number of pages in the low and high groups is less than the number of the pages of the selected block.

In operation 630, the selection component 514 may generate multiple unordered page pairs by sequentially selecting one page from the low group as a first page of each unordered page pair and one page from the high group as a second page of each unordered page pair. In some embodiments, the identification server 550 may provide to the selection component 514 each of challenge values to select one page from the low group as the first page and one page from the high group as the second page.

In operation 640, the selection component 514 may generate multiple ordered page pairs by selectively converting an order of pages in each pair of the multiple unordered page pairs based on an address order between the first page of the low group and a next page of the low group following the first page. In some embodiments, for each pair of the multiple unordered page pairs, the selection component 514 may convert the order of the first page and the second page when addresses of the first page and the next page of the low group are in descending order. Further, the selection component 514 may not convert the order of the first page and the second page in each pair of the multiple unordered page pairs when addresses of the first page and the next page of the low group are in ascending order.

In operation 650, the comparison component 516 may generate a sequence for identifying the selected block based on comparing of the average number of ones for a former page and a latter page in each pair of the multiple ordered page pairs. In some embodiments, the comparison component 516 may transfer the sequence to the identification server 550.

In some embodiments, for each pair of the multiple ordered page pairs, the comparison component 516 may compare the average number of ones between the former page and the latter page. The comparison component 516 may generate a bit having a first value when the latter page has the higher average number of ones than that of the former page. The comparison component 516 may generate a hit having a second value when the former page has the higher average number of ones than that of the latter page.

Details of the ID generation method of he system 500 are described with reference to FIGS. 5 and 7-10.

The ID generation method of the system 500 may be based on raw read operations, which bypass error correction code (ECC) and scrambling processes on read data in a data path. The ID generation method may include a first stage (enrollment), a second stage (uniqueness extraction) and a third stage (ID generation). The first stage (enrollment) may include erasing a selected block of NAND flash memory and writing a set pattern (e.g., all-zero pattern) to all pages within the selected block. Then, multiple raw read operations may be performed. During multiple raw read operations, each page may be characterized by an average number of ones obtained through each read operation. The second stage (uniqueness extraction) may include generating a sequence of page addresses using page statistics computed during enrollment. In some embodiments, the number of pages may be the same as the doubled ID length. The third stage (ID generation) may include comparing the number of ones from the chosen pages during the raw read operation, which allows generating unique ID bits. For two chosen and compared pages, if a first page has less ones than a second page, a bit of ID with a value of zero may be generated. Otherwise, a bit of ID with a value of one is generated.

A page may be a minimal reading unit in the NAND flash memory 512 and may be characterized by a number of bits which flip their values during a read operation. To highlight flipping bits, a set pattern (e.g., an all-zero pattern) may be programmed in the page. After multiple raw read operations (i.e., bypassing ECC and scrambling processes), the average number of ones obtained during the read operations may characterize the page. These statistics may be obtained during the enrollment stage. In some embodiments, the enrollment stage may include: erasing a block of memory; programming in a raw mode an all-zero pattern to all pages of a block; reading in the raw mode each page $N_r$ times; and computing the average number of ones during $N_r$ raw read operations.

Figure 7:
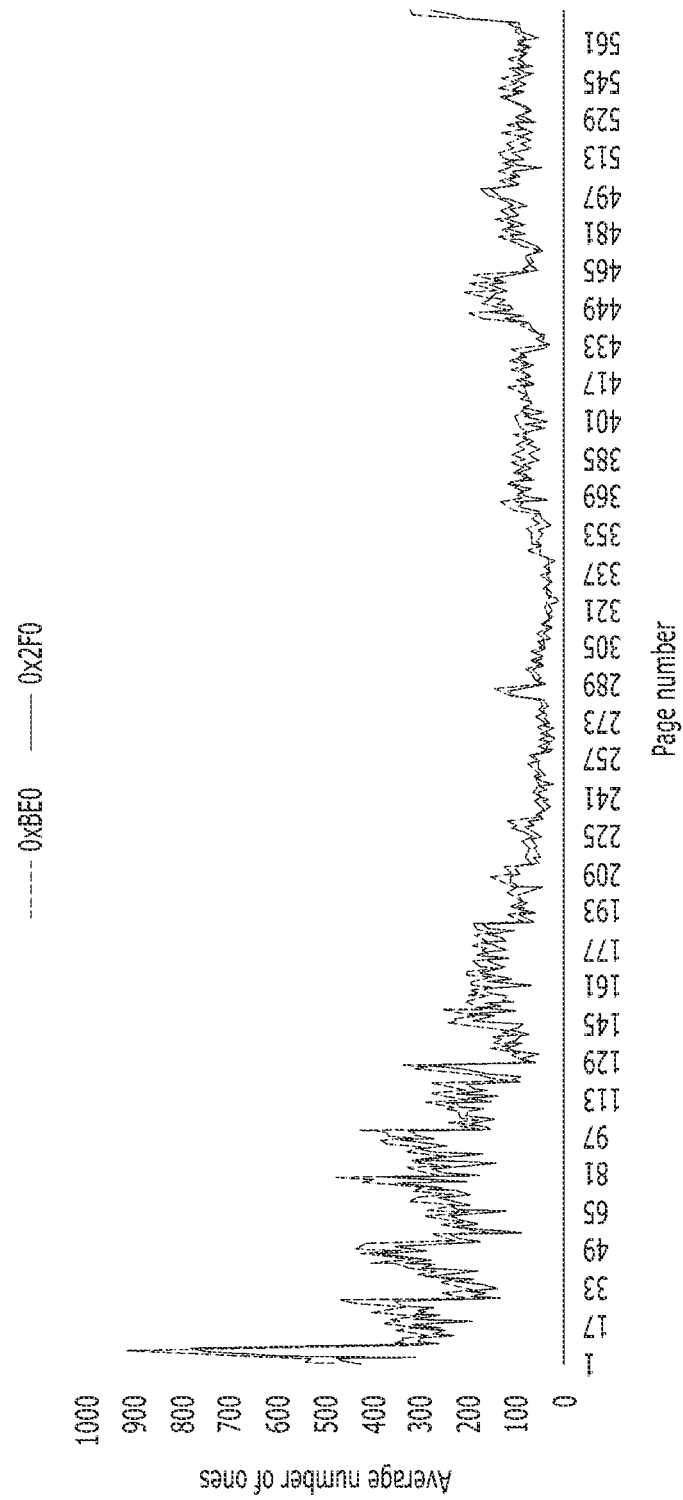
FIG. 7 is a graph illustrating an average number of ones obtained during raw read operations for two memory blocks of a memory device in accordance with an embodiment of the present invention.

For example, statistics for two blocks of the memory device 512 with addresses "0xBE0" and "0x2F0" are shown in FIG. 7 ($N_r$=100).

The distribution of the average number of ones in pages ($p_i^{avg}$, $1 \leq i \leq N_p$, $N_p$—the number of pages in a block of memory) is unique for every block in the memory device 512. Therefore, the subtle intrinsic difference in this distribution can be utilized to design a NAND flash memory based physical unclonable function. The block diagram for a proposed PUF design for ID generation is already shown in FIG. 5.

Referring back to FIG. 5, to generate a single response bit R, the identifiable device 510 may compare the number of ones of two different pages $p_i$ and $p_j$ ($i \neq j$, $1 \leq i, j \leq N_p$), which are obtained during a raw read operation. The two different pages $p_i$ and $p_j$ may be chosen based on a challenge value C=(i, j). The challenge value C may be an ordered pair of page addresses i and j which takes one of possible $$K = \frac{N_p(N_p - 1)}{2}$$

values. If $p_i < p_j$, R=0. Otherwise, R=1.

The identifiable device 510 may generate K possible response bits based on the challenge value C. To generate an L-bit ID (L≤K), the identification server 550 may generate L challenges (2L page addresses) and send L challenges to the identifiable device 510. As a result, the identifiable device 510 may produce L response bits, which uniquely identify it.

Due to intrinsic NAND instability, values $p_i$ and $p_j$ may have different values from one read operation to another. This leads to the instability of generated response values R during different read operations for the same address values i and j. Also, the order of values $p_i$ and $p_j$ may be different ($p_i < p_j$ or $p_i > p_j$). Thus, the subset of challenge values has to be found to provide a reliable identification (i.e., stable responses).

Figure 8:
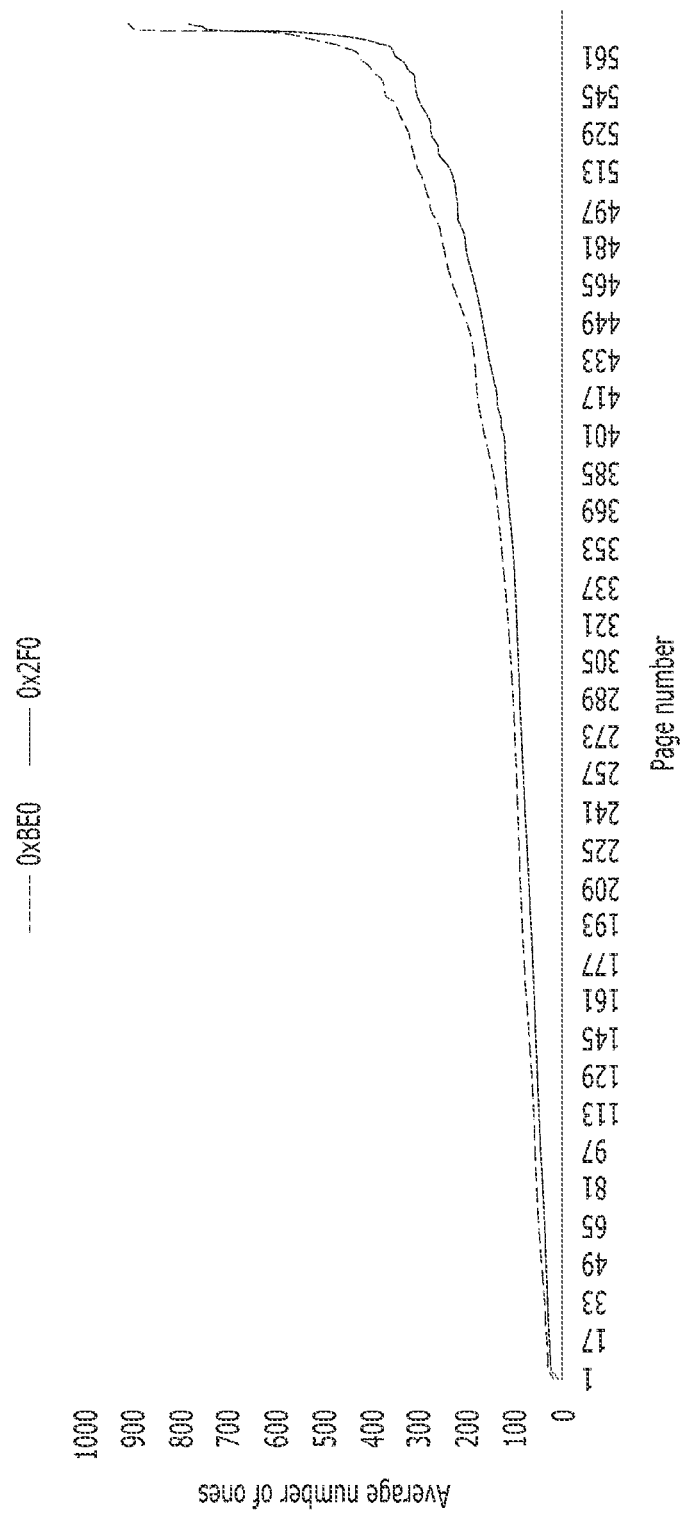
FIG. 8 is a graph illustrating an average number of ones obtained and sorted during raw read operations for two memory blocks of a memory device in accordance with an embodiment of the present invention.

When the average number of ones obtained during the enrollment stage are sorted, the average number of ones may be separated into two groups with lower and higher values of $p_i^{avg}$ Sorted values are shown in FIG. 8.

Referring to FIG. 8, the higher the difference between the average number of ones obtained for two pages $p_i^{avg}$ and $p_j^{avg}$ in each of two blocks "0xBE0" and "0x2F0", e.g., $p_i^{avg} > p_j^{avg}$, i≠j, the higher the probability to keep the order between the number of ones obtained during an arbitrary read operation $p_i > p_j$. This observation also can be confirmed based on experimental data obtained from the block "0x2F0." Data (i.e., the number of ones), which are obtained during two raw read operations (e.g., 10-th and 100-th reads) and the average value thereof is shown in FIG. 9.

Figure 9:
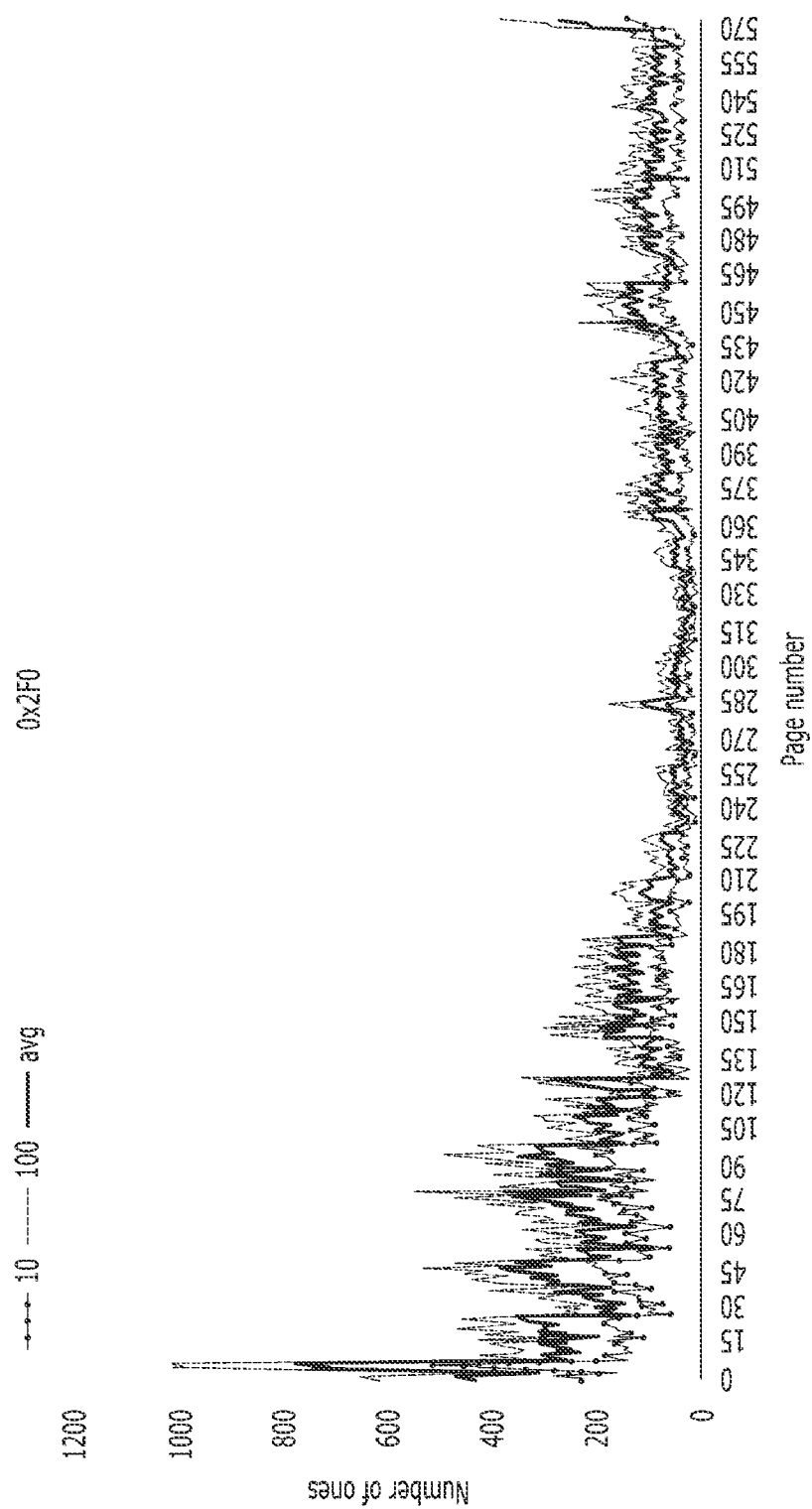
FIG. 9 is a graph illustrating the number of ones obtained during two raw read operations for two memory blocks of a memory device and an average number of ones in accordance with an embodiment of the present invention.

Referring to FIG. 9, the value of the difference ($p_i - p_j$) between two pages $p_i$ (taken from pages with higher $p_i^{avg}$ values) and $p_j$ (taken from pages with lower $p_i^{avg}$ values) may change its value, but a sign value ($p_i - p_j$) will be the same with a high probability for all read operations from 1 to at least 100, Therefore, to generate an L-bit identifier, L challenges $C_k = (i, j)$, 1≤k≤L, should be chosen based on the enrollment data. There are multiple ways of doing this. In some embodiments, the system 500 may generate L challenges to generate an L-bit identification sequence as shown in FIG. 10.

Figure 10:
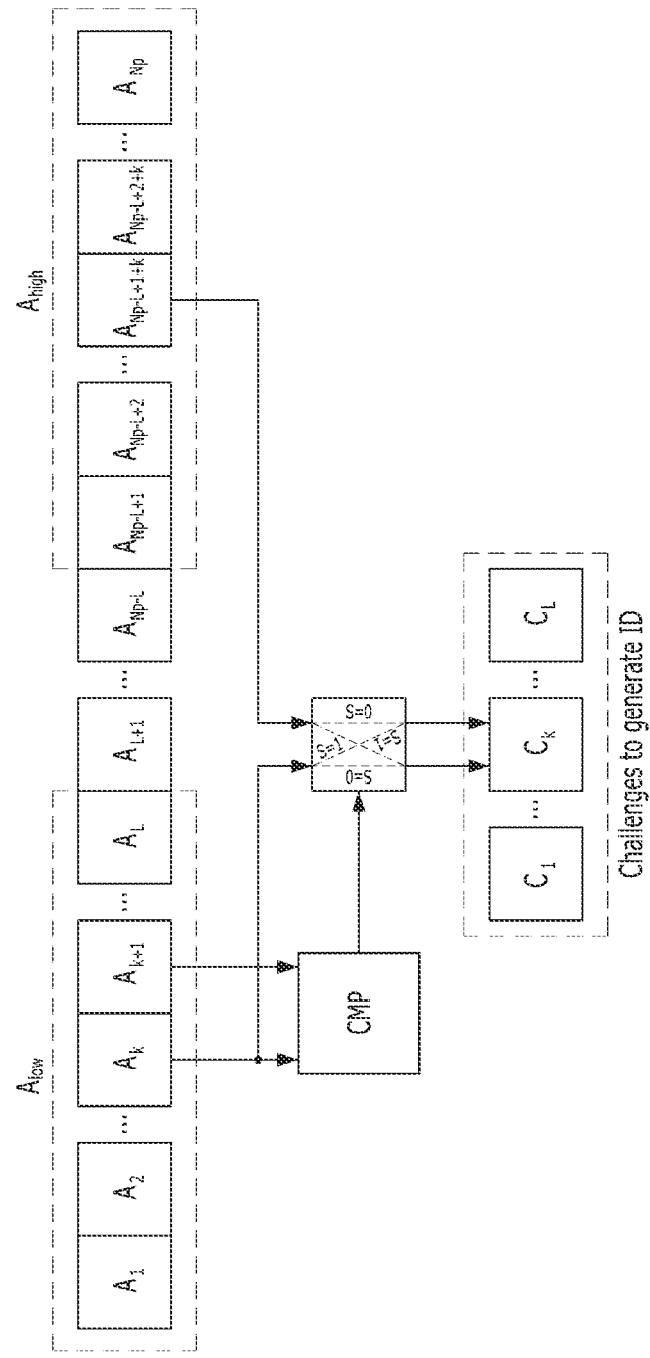
FIG. 10 is a diagram illustrating an operation of forming challenges in accordance with an embodiment of the present invention.

Referring to FIG. 10, the system 500 may generate L challenges through an algorithm including the following four steps.

(1) The system 500 may sort all of the pages of a selected block by the average number of ones values obtained during raw read operations ($p_i^{avg}$) in a set order (e.g., the ascending order). As a result, the sequence of page addresses corresponding to the sorted values may be represented as $A_1, A_2, \ldots, A_{N_p}$.

(2) The system 500 may split the sequence into two L-element subsequences, namely a low group $A_{low} = (A_1, A_2, \ldots, A_L)$ with a lower value of $p_i^{avg}$ and a high group $A_{high} = (A_{N_p-L+1}, A_{N_p-L+2}, \ldots, A_{N_p})$ with a higher value of $p_i^{avg}$. In the illustrated example, a total number of pages in the low and high groups is less than the number of all of the pages of the selected block.

(3) To generate a k-th bit of identifier, the system 500 may form an unordered pair of addresses $\{A_k, A_{N_p-L+1+k}\}$ (1≤k≤L<$N_p$), where $A_k$ is in the low group $A_{low}$ and $A_{N_p-L+1+k}$ is in the high group $A_{high}$. If $A_k$ and $A_{N_p-L+1+k}$ are chosen from the groups $A_{low}$ and $A_{high}$ correspondingly, there is a high probability that $p_{A_k} < p_{A_{N_p-L+1+k}}$. Therefore, the unordered pair should be converted to the ordered pair (challenge value $C_k$) by some unique characteristics.

(4) The system 500 may convert each unordered pair $\{A_k, A_{N_p-L+1+k}\}$ to the challenge value $C_k = (A_k, A_{N_p-L+1+k})$ or $C_k = (A_{N_p-L+1+k}, A_k)$. This conversion may be done based on the unique sequences of addresses in the low group $A_{low}$ as follows:

(4-a) Consider k-th element of $A_{low}(A_k)$ and the next one ($A_{k+1}$);
(4-b) if $A_k < A_{k+1}$, unordered pair $\{A_k, A_{N_p-L+1+k}\}$ is converted to $C_k = (A_k, A_{N_p-L+1+k})$;
(4-c) otherwise, unordered pair $\{A_k, A_{N_p-L+1+k}\}$ is converted to $C_k = (A_{N_p-L+1+k}, A_k)$; and
(4-d) if k=L, $A_{L+1}'$ element is taken from a full sequence of sorted values.

The algorithm above is given as an example and can be changed to other ones in order to choose the most stable responses.

In the ID generation stage, the system 500 may perform a raw read operation 2L times from selected pages. To generate a k-th bit, values $p_{A_k}$ and $p_{A_{N_p-L+1+k}}$ may be compared. If the pair of addresses is ($A_k, A_{N_p-L+1+k}$) in most cases, a value of 0 may be generated. If the pair of addresses is ($A_{N_p-L+1+k}, A_k$) in the most cases, a value of 1 may be generated.

As a result, L-bit identifier may be generated using 2L raw read operations. The set of challenges $C_k$ may be either stored in a memory (not shown) of the identifiable device 500 for a better reliability or generated by choosing L pairs from possible K options.

An example of the ID generation method of the system 500 is described below.

Results of the enrollment stage for the block "0x2F0" are shown in FIG. 7.

The uniqueness extraction stage includes the following operations.

(Operation 1) The list of page addresses sorted by $p_i^{avg}$ values is formed as follows: 324, 325, 266, . . . , 1, 5, 7 (576 addresses in total).

(Operation 2) To generate L=128 bit identifier, the sequence may be split into two groups, each group including 128 addresses: $A_{low} = (A_1, A_2, A_3, \ldots, A_{126}, A_{127}, A_{128}) = (324, 325, 266, 254, 301, 242)$; and $A_{high} = (A_{449}, A_{450}, A_{451}, \ldots, A_{574}, A_{575}, A_{576}) = (30, 159, 179, \ldots, 1, 5, 7)$.

(Operation 3) The two groups are merged into the sequence as represented in List1:

| List1: |
| --- |
| The unordered pair $\{A_1, A_{449}\} = \{324, 30\}$ is converted to $C_1 = (A_1, A_{449}) = (324, 30)$ as $A_1 < A_2 (324 < 325)$;<br>The unordered pair $\{A_2, A_{450}\} = \{325, 159\}$ is converted to $C_2 = (A_{450}, A_2) = (159, 325)$ as $A_2 > A_3 (325 > 266)$;<br>The unordered pair $\{A_3, A_{451}\} = \{266, 179\}$ is converted to $C_3 = (A_3, A_{451}) = (266, 179)$ as $A_3 < A_4 (266 < 314)$;<br>...<br>The unordered pair $\{A_{126}, A_{574}\} = \{254, 1\}$ is converted to $C_{126} = (A_{126}, A_{574}) = (254, 1)$ as $A_{126} < A_{127} (254 < 301)$;<br>The unordered pair $\{A_{127}, A_{575}\} = \{301, 5\}$ is converted to $C_{127} = (A_{575}, A_{127}) = (5, 301)$ as $A_{127} > A_{128} (301 > 242)$; and<br>The unordered pair $\{A_{128}, A_{576}\} = \{242, 7\}$ is converted to $C_{128} = (A_{128}, A_{576}) = (242, 7)$ as $A_{128} < A_{129} (242 < 110)$. |

The ID generation stage may be performed based on the sequence generated during the uniqueness extraction stage as represented in List2:

| List2: |
| --- |
| For $C_1$, 0 as $p_{324} < p_{30}$;<br>For $C_2$, 1 as $p_{159} > p_{325}$; |

-continued

List2:

For $C_3$, 0 as $p_{266} < p_{179}$;
...
For $C_{126}$, 0 as $p_{254} < p_1$;
For $C_{127}$, 1 as $p_5 > p_{301}$; and
For $C_{128}$, 0 as $p_{242} < p_7$.

Experimental results of the ID generation method of the system 500 are described below.

The 128-bit IDs were generated from two different samples (10 blocks each with the same addresses)—total 20 IDs.

Reliability shows how stable the ID generated during T tests (repeated generations) is. It can be computed as the following $$R = 1 - BER = 1 - \frac{1}{T}\sum_{t=1}^{T} HD(ID, ID_t)$$ Equation 20

In the Equation above, HD represents a Hamming distance and $ID_t$ represents ID generated during t-th test.

The ideal value of reliability is 1.0, i.e., the generated ID is stable and does not change its value during repeated generations. All IDs generated in the experiment have R=1.0, except three of them, which have 0.980, 0.989, 0.990.

Uniqueness shows the difference between IDs generated from different samples (inter-die uniqueness) or different blocks within the same sample (intra-die uniqueness). The ideal value of uniqueness is 0.5, which is the maximum percentage of bit differences that can be obtained between binary vectors.

Intra-die uniqueness for m IDs can be computed as follows:

$$U_{intra} = \frac{2}{m(m-1)}\sum_{u=1}^{m-1}\sum_{v=u+1}^{m} HD(ID_u, ID_v).$$

For m=10 IDs (each sample), $U_{intra}$=0.502 for the sample 1 and $U_{intra}$=0.498 for the sample 2.

Inter-die uniqueness for m IDs situated at the same address in different two samples can be computed as follows:

$$U_{inter} = \frac{1}{m}\sum_{i=1}^{m} HD(ID_i^1, ID_i^2).$$

$U_{inter}$=0.518 for two identical samples (m=10 for each sample).

Also, the ID generation method of the system 500 has been stress tested by 10,000 erases. The ID was generated after each erase for 5 times. Therefore, 50,000 IDs were generated during the test. Only 16 of them had single bit flip and the rest 49984 IDs were the same (without bitflips). The reliability value for this test is R=0.9999975.

As described above, embodiments provide a scheme to generate a unique, reliable, unpredictable, and unclonable ID for flash memory devices.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the appended claims. Furthermore, the embodiments may be combined to form additional embodiments.

What is claimed is:

1. A system comprising:
an identifiable device including a controller and a memory device coupled to the controller and including a plurality of blocks,
wherein the controller is configured to:
perform multiple raw read operations on every page of a block selected from among the plurality of blocks, each of the multiple raw read operations performed for each page producing a corresponding number of one values for said each page;
determine, for each page of the selected block, an average of the number of one values obtained from the multiple raw read operations;
sort the pages of the selected block into low and high groups based on the average of the number of one values obtained from the multiple raw read operations for each page;
generate multiple unordered page pairs by selecting one page from the low group as a first page of each unordered page pair and one page from the high group as a second page of each unordered page pair;
generate multiple ordered page pairs by selectively converting an order of pages in each pair of the multiple unordered page pairs based on page address order between the first page of the low group and a next page of the low group following the first page; and
generate a sequence for identifying the selected block based on comparing of the average of the number of one values for a former page and a latter page in each pair of the multiple ordered page pairs.

2. The system of claim 1, further comprising:
an identification server configured to provide to the controller each of challenge values to select one page from the low group as the first page and one page from the high group as the second page.

3. The system of claim 2, wherein the controller is further configured to transfer the sequence to the identification server.

4. The system of claim 1, wherein the controller is further configured to:
before performing the multiple raw read operations,
erase a block selected from among the plurality of blocks; and
write a set pattern to all pages of the selected block.

5. The system of claim 4, wherein the set pattern includes an all-zero pattern.

6. The system of claim 1, wherein the pages of the selected block are aligned in ascending order based on the average of the number of one values,
wherein the low group includes a set number of pages from a page having a lowest average of the number of one values, and
wherein the high group includes the set number of pages from a page having a highest average of the number of one values.

7. The system of claim 6, wherein a total number of pages in the low and high groups is less than the number of the pages of the selected block.

8. The system of claim 1, wherein the controller is configured to:
for each pair of the multiple unordered page pairs,
convert the order of the first page and the second page when addresses of the first page and the next page of the low group are in descending order, and
do not convert the order of the first page and the second page in each pair of the multiple unordered page pairs when addresses of the first page and the next page of the low group are in ascending order.

9. The system of claim 1, wherein the controller is configured to:
for each pair of the multiple ordered page pairs,
compare the average of the number of one values between the former page and the latter page;
generate a bit having a first value when the latter page has the higher average of the number of one values than that of the former page; and
generate a bit having a second value when the former page has the higher average of the number of one values than that of the latter page.

10. The system of claim 1, wherein each of the multiple raw read operations includes:
reading each page of the selected block multiple times without a process using an error correction code (ECC) and scrambling on the read page.

11. A method for operating an identifiable device including a controller and a memory device coupled to the controller and including a plurality of blocks, the method comprising:
performing multiple raw read operations on every page of a block selected from among the plurality of blocks, each of the multiple raw read operations performed for each page producing a corresponding number of one values for said each page;
determining, for each page of the selected block, an average of the number of one values obtained from the multiple raw read operations;
sorting the pages of the selected block into low and high groups based on the average of the number of one values obtained from the multiple raw read operations for each page;
generating multiple unordered page pairs by selecting one page from the low group as a first page of each unordered page pair and one page from the high group as a second page of each unordered page pair;
generating multiple ordered page pairs by selectively converting an order of pages in each pair of the multiple unordered page pairs based on page address order between the first page of the low group and a next page of the low group following the first page; and
generating a sequence for identifying the selected block based on comparing of the average of the number of one values for a former page and a latter page in each pair of the multiple ordered page pairs.

12. The method of claim 11, further comprising:
receiving, from an identification server, each of challenge values to select one page from the low group as the first page and one page from the high group as the second page.

13. The method of claim 12, further comprising:
transferring the sequence to the identification server.

14. The method of claim 11, further comprising:
before performing the multiple raw read operations,
erasing a block selected from among the plurality of blocks; and
writing a set pattern to all pages of the selected block.

15. The method of claim 14, wherein the set pattern includes an all-zero pattern.

16. The method of claim 11, wherein the pages of the selected block are aligned in ascending order based on the average of the number of one values,
wherein the low group includes a set number of pages from a page having a lowest average of the number of one values, and
wherein the high group includes the set number of pages from a page having a highest average of the number of one values.

17. The method of claim 16, wherein a total number of pages in the low and high groups is less than the number of the pages of the selected block.

18. The method of claim 11, wherein the generating the multiple ordered page pairs includes:
for each pair of the multiple unordered page pairs,
converting the order of the first page and the second page when addresses of the first page and the next page of the low group are in descending order, and
not converting the order of the first page and the second page in each pair of the multiple unordered page pairs when addresses of the first page and the next page of the low group are in ascending order.

19. The method of claim 11, wherein the generating the sequence includes:
for each pair of the multiple ordered page pairs,
comparing the average of the number of one values between the former page and the latter page;
generating a bit having a first value when the latter page has the higher average of the number of one values than that of the former page; and
generating a bit having a second value when the former page has the higher average of the number of one values than that of the latter page.

20. The method of claim 11, wherein each of the multiple raw read operations includes:
reading each page of the selected block multiple times without a process using an error correction code (ECC) and scrambling on the read page.

21. The system of claim 1, wherein the averages of the number of one values of the pages of the selected block is based on a physically unclonable function of the memory device.

* * * * *